United States Patent
Cooke

[15] 3,665,521
[45] May 30, 1972

[54] MARINE TOILET

[72] Inventor: George H. Cooke, P.O. Box 4552, Fort Lauderdale, Fla. 33304

[22] Filed: Aug. 15, 1969

[21] Appl. No.: 850,520

[52] U.S. Cl. .................................................4/10, 241/46.02
[51] Int. Cl. ....................................B02c 18/40, B02c 18/14
[58] Field of Search ..................241/46.02, 46.11, 46.17, 62, 241/97, 41, 42, 45; 210/173, 152; 4/10, 8

[56] References Cited

UNITED STATES PATENTS

| | | | |
|---|---|---|---|
| 1,874,553 | 8/1932 | Liebeck | 241/46.02 |
| 2,485,368 | 10/1949 | Dodge | 241/46.17 X |
| 2,999,650 | 9/1961 | Campagnano | 241/46.17 |
| 3,323,650 | 6/1967 | Kilbane | 241/46.17 X |
| 2,951,251 | 9/1960 | Belden | 4/10 UX |
| 3,044,077 | 7/1962 | Belden | 4/10 |

Primary Examiner—Donald G. Kelly
Attorney—Eugene F. Malin

[57] ABSTRACT

A processing tank for a mobile water closet having a blade for masticating and grinding waste material, a propellor for generating a flow within the tank, and a plurality of partitions for creating a circulatory flow pattern to insure complete processing of the waste material by preventing accumulation of large solids within the tank. A chlorinating device is inserted in the flow pattern for proper chlorination of all waste material.

4 Claims, 2 Drawing Figures

PATENTED MAY 30 1972  3,665,521

INVENTOR
GEORGE H. COOKE

BY
ATTORNEY

MARINE TOILET

BACKGROUND OF THE INVENTION

This invention relates generally to a water closet for use in a mobile vehicle such as a boat, in which there is a requirement for treatment of raw sewage prior to discharge and includes a novel arrangement of components in the processing tank whereby complete mastication and chlorination of the waste material is assured by the employment of a propellor means and a plurality of partitions to provide recirculation of the waste material through a masticating means with no accumulation of large waste solids within the tank.

Water closets having sewage treatment tanks are well-known in the art. Stringent pollution laws demand more and more efficient treatment of sewage prior to its discharge into, for example, rivers or streams. This invention relates to an improved processing tank that provides for complete disintegration and chlorination of all the waste material in the tank. Thorough chlorination can be achieved only with complete disintegration of the waste material into very small particles.

BRIEF SUMMARY OF THE INVENTION

The invention consists generally of a toilet bowl, a flushing means, and a processing tank. The processing tank includes a masticating means, a flow inducing means, and partition means for creating a flow pattern within the tank that insures recirculation of the waste material back to the masticating means. Also included within the processing tank is a chlorine dispensing device for chlorination of the disintegrated waste material. An input from the toilet bowl is positioned directly above the masticating means. A switch controlled by the float from the flushing means controls the operation of the masticating means and flow inducing means. The flow inducing means and the partition means are placed in such a manner that the waste material that has been masticated will circulate within the tank. Eddy currents from the interaction of the flowing waste materials with the partition means. Such currents prevent accumulation of large solids within the tank.

It is an object of this invention to provide a more efficient disintegration and chlorination of waste material in a mobile water closet.

A further object of this invention is to provide a mobile water closet having in the processing tank, a novel flow pattern providing for circulation of all waste material in the tank.

An additional object of this invention is to provide a mobile water closet with a processing tank that assures thorough chlorination of all waste materials.

In accordance with these and other objects which will be apparent hereinafter, the instant invention will now be described with particular reference to the accompanying drawings.

DETAILED DESCRIPTION OF THE INVENTION

Figure 1:
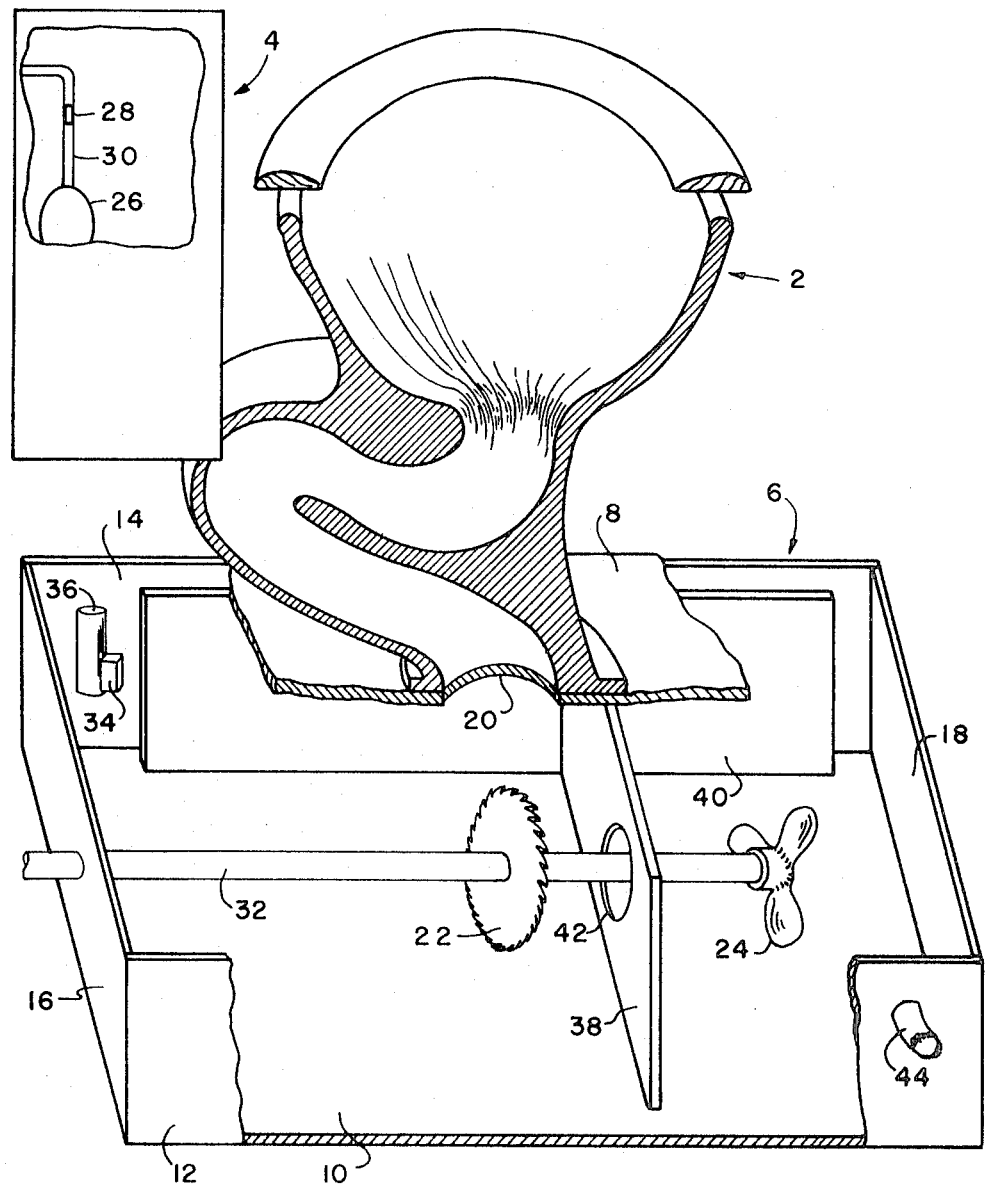
FIG. 1 is a perspective cutaway view of the water closet.
Figure 2:
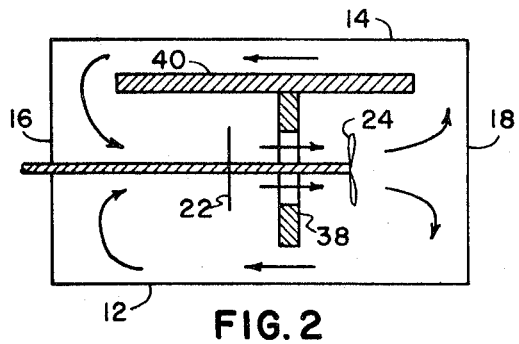
FIG. 2 is a top cross sectional flow diagram of the waste material in the processing tank during operation.

Referring now to the drawing and in particular to FIG. 1, one preferred embodiment is shown. Toilet bowl 2 is shown supported on processing tank, indicated generally as 6. Flushing means 4 is connected in any well-known manner to toilet bowl 2. Processing tank 6 is made up of bottom 10, walls 12, 14, 16, 18, and top 8. Within processing tank 6 is shown shaft 32 which rotates a masticating means, illustrated as a thin blade 22 and propeller 24. Shaft 32 is connected to a motor (not shown). Partition 38 separates thin blade 22 from propellor 24. Partition 38 also contains a large aperture 42 which permits shaft 32 to rotate both thin blade 22 and propellor 24, and also flow of the masticated waste product from thin blade 22 to propeller 24. Partition 40 is spaced parallel to and slightly away from wall 14 and is perpendicular to partition 38. Neither partitions 38 nor 40 extend completely across tank 6. Sufficient space is left between the ends of the partitions 38 and 40 and the walls of the tank 12, 14, 16, and 18 to provide for the recirculating flow as indicated in FIG. 2. Attached also to wall 14 is a dispensing device 36 for dispensing chlorine or any treating material and an activating switch 34 which stops the dispensing device when processing tank 6 becomes full.

In operation conventional flushing means 4 removes waste material from toilet bowl 2. Waste material moves to aperture 20 which connects toilet bowl 2 to processing tank 6. Upon activation of flushing means 4, the water level in flushing means 4 will drop and float 26 will drop with the water level, closing switch 28 and energizing motor (not shown) that is connected to shaft 32, thus rotating thin blade 22 and proepllor 24 in conjunction with the activation of flushing means 4. Upon transmission to aperture 20, waste material is deposited upon thin blade 22 and the material is thereby masticated.

FIG. 2 shows a general flow diagram. Propellor 24 produces flow from thin blade 22, through aperture 42, toward wall 18. At wall 18, the flow of waste material will divide toward walls 12 and 14. Because of the partitions 38 and 40, flow will then continue down sides 12 and 14 toward wall 16 where it will reverse direction and be drawn back toward blade 22 where further mastication will take place. Eddy currents will be generated around the edges of partitions 38 and 40, the effect of which will be to create turbulent areas that will prevent large solids from accumulating within the tank and insure their recirculation back to the thin blade 22.

Returning to FIG. 1, the chlorinating device 36 is positioned anywhere within the recirculating continuous flow pattern. The chlorine or any suitable treating agent will be dispensed during operation of the tank until the tank is filled. This insures thorough chlorination of all the waste material. Switch 34 will stop the chlorinating dispensing device whenever tank 6 is completely filled. Propeller 24 is preferably a two or three bladed propeller. Switch 28 also provides a refilling indication to flushing means 4 to prepare it for the next cycle of operation. Discharge of the waste material from the processing tank may be accomplished in any well-known manner. For simplicity, the discharge outlet line 44 is shown near the top of wall 12. The maximum fluid level is below blade top, creating aeration.

Of course partitions 38 and 40 could be rearranged in various relationships as long as the basic general recirculating flow pattern is maintained. For example, replacing the T-shaped partition with a curved J-shaped one has been found effective for use in a tank that is narrow in the horizontal plane perpendicular to the shaft 32 axis. The leg of the J (not shown) is parallel to wall 14 while the curved portion contains an aperture for the shaft.

The instant invention has been shown and described herein in what is considered to be the most practical and preferred embodiment. It is recognized, however, that departures may be made therefrom within the scope of the invention.

What I claim is:

1. A combination of a water closet and a sewage container means for processing raw sewage comprising:
    water closet, and
    a sewage container means, including
        inlet means for receiving raw sewage from a water closet, masticating means connected beneath said inlet means for cutting raw sewage from the water closet, means for further masticating and circulating the raw sewage in said container means, drive means for driving said masticating means and said masticating-circulating means, a generally vertically disposed partition in said container means for directing the raw sewage to circulate in a generally horizontal path around said partition past said masticating means and said masticating-circulating means, and outlet means for discharging the masticated raw sewage.

2. A combination of a water closet and a sewage container means for processing raw sewage as set forth in claim 1, wherein;

said partition is a generally T-shaped member with the aperture in one leg with said masticating means on one side of said aperture and said masticating-circulating means on the other side of said aperture.

3. A combination of a water closet and a sewage container means for processing raw sewage comprising:

a water closet with an outlet, a sewage container means for receiving raw sewage connected to said outlet in said water closet, said sewage container means including an inlet is said sewage container means connected to said outlet in said water closet, a cutting means for cutting the raw sewage within said sewage container means, said cutting means located directly beneath the outlet in said water closet to cut raw sewage as it initially enters said recepticle, a propellor means for creating a circulating flow of the raw sewage within said sewage container means and for masticating the raw sewage, drive means for said cutting and propellor means, and an outlet means for discharging the treated sewage.

4. A combination of a water closet and a sewage container means for processing raw sewage as in claim 3, wherein:

a generally vertically disposed partition in said container means for directing the raw sewage to circulate in a generally horizontal path around said partition past said cutting means and said propellor means.

* * * * *